Sept. 12, 1933.    R. BIRMANN    1,926,225
TURBO COMPRESSOR
Filed Sept. 12, 1930    4 Sheets-Sheet 1

WITNESS:

INVENTOR
Rudolph Birmann
BY
Busser & Harding
ATTORNEYS.

Sept. 12, 1933.  R. BIRMANN  1,926,225
TURBO COMPRESSOR
Filed Sept. 12, 1930   4 Sheets-Sheet 2
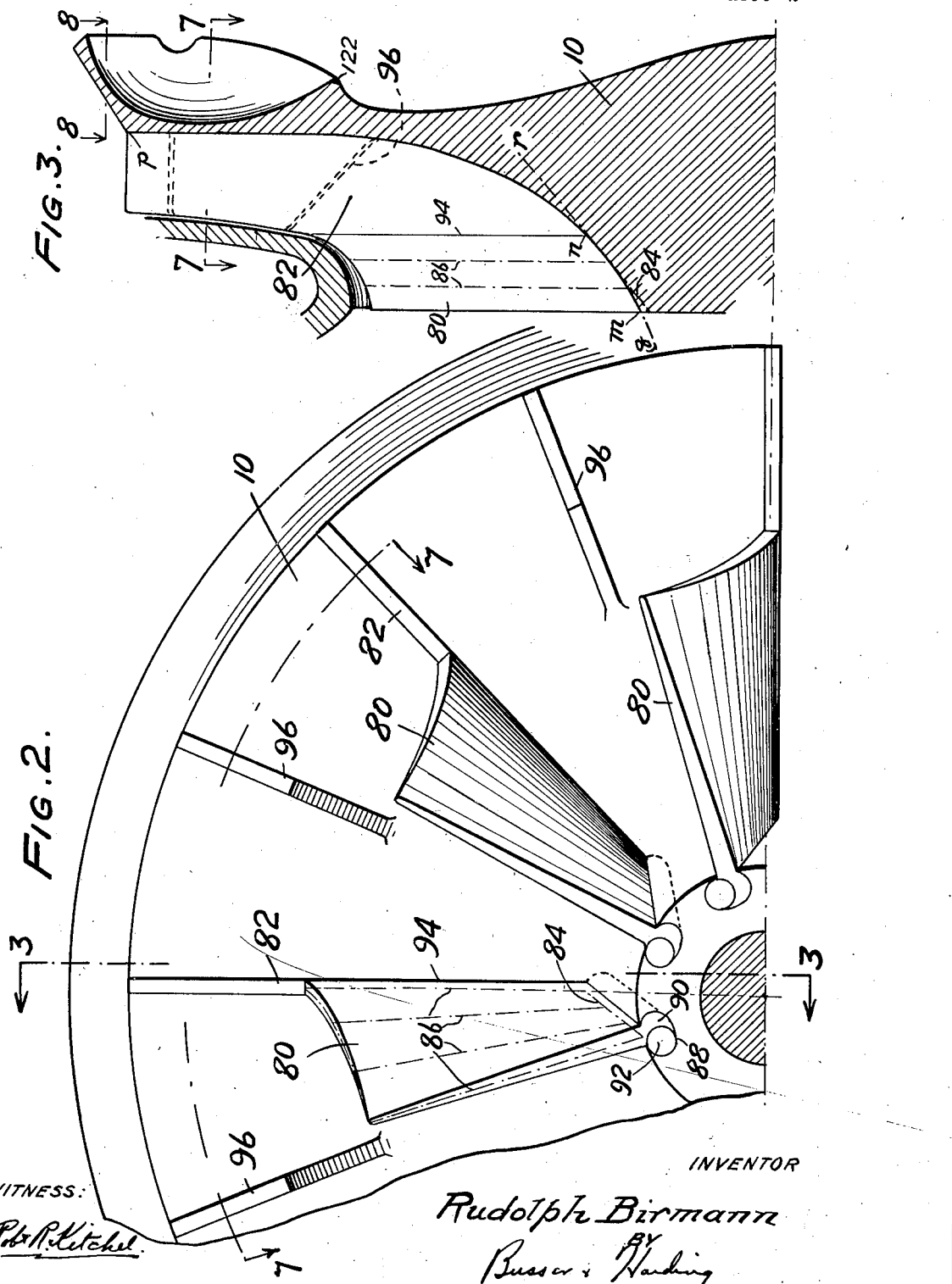

Sept. 12, 1933.  R. BIRMANN  1,926,225
TURBO COMPRESSOR
Filed Sept. 12, 1930    4 Sheets-Sheet 3
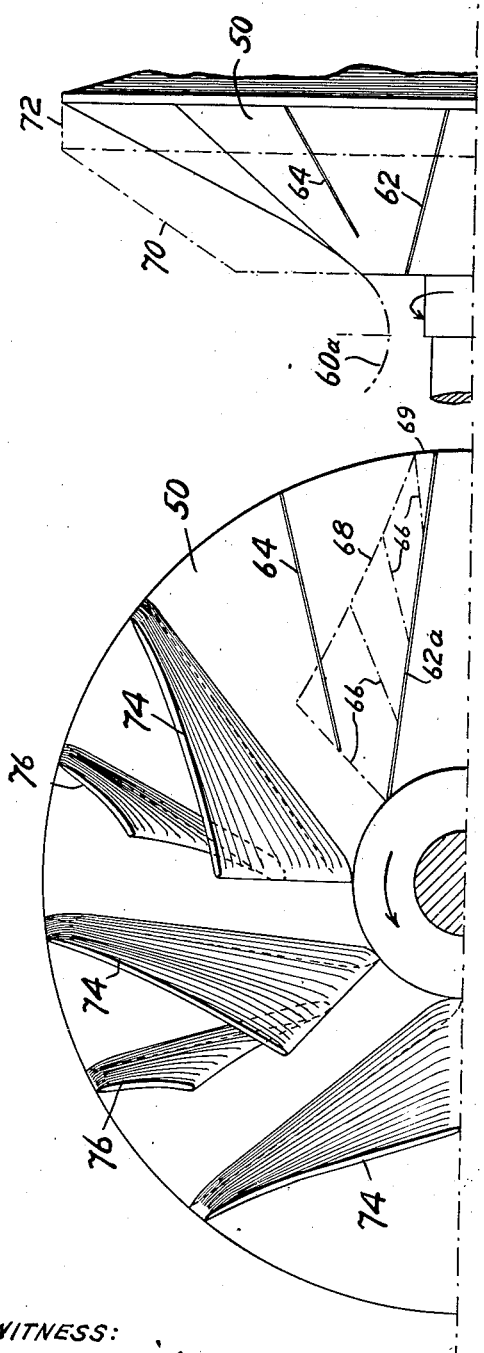
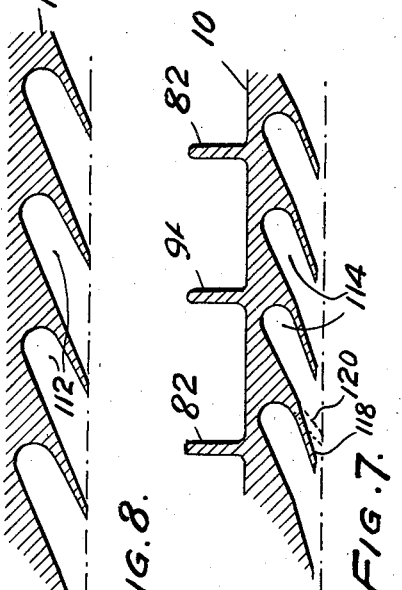
INVENTOR
Rudolph Birmann
BY
Busser & Harding
ATTORNEYS.

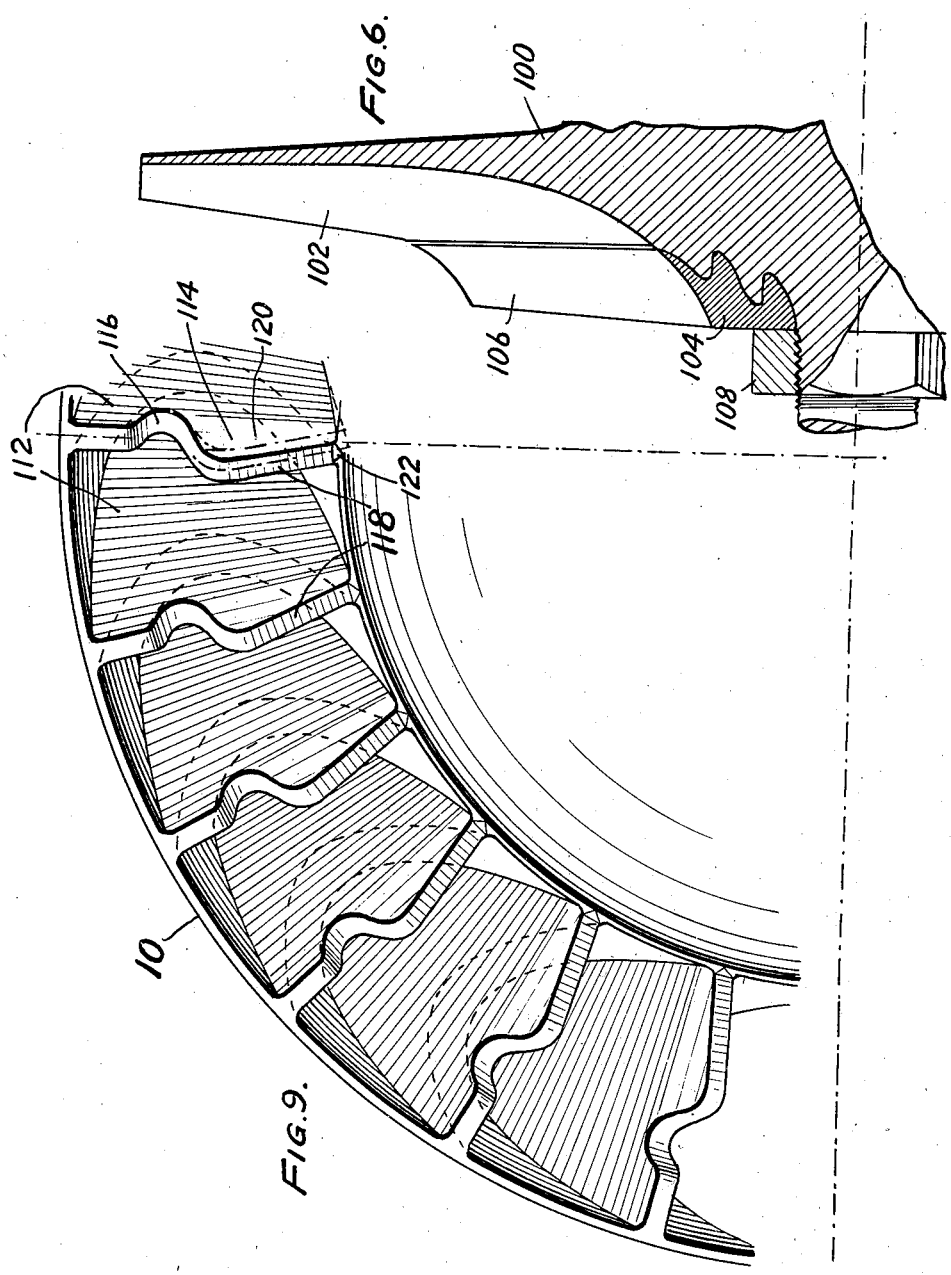

Patented Sept. 12, 1933

1,926,225

UNITED STATES PATENT OFFICE 1,926,225

TURBO COMPRESSOR

Rudolph Birmann, Trenton, N. J.

Application September 12, 1930
Serial No. 481,469

12 Claims. (Cl. 230—57)

This invention relates to features of a turbo-compressor arrangement particularly adapted for use in a supercharging system for internal combustion engines in which a centrifugal compressor of one or more stages is driven by a turbine receiving exhaust gases from the engine. While the features are specifically illustrated in this arrangement, they are of more general application in the design and operation of turbines and centrifugal compressors either alone or in combination.

This application is in part a continuation of my prior application, Serial Number 402,335, filed October 25, 1929, entitled "Supercharging system for internal combustion engines".

In this prior application there is described and claimed an arrangement whereby the heat, pressure and velocity energy of the exhaust gases of an engine may be partially utilized to effect supercharging by driving a turbine which in turn drives a centrifugal compressor arrangement operative to compress air for the intake of the engine. The application specifically describes means for storing up kinetic energy as well as pressure and heat energy for uniform feed to the turbine with resultant attainment of high turbine efficiency.

One feature claimed in the present application is an improved design of combined turbine and compressor rotor which will serve to secure a cooling thereof below dangerous temperatures.

Another feature of the invention relates to a novel design for impeller blades of general applicability whereby damage due to very high centrifugal stresses is prevented and impact and friction losses are reduced. Details of construction and particular arrangement of these blades for specific cases also form features of the invention.

A further feature of the invention is a novel construction of turbine buckets suitable for high speed operation under high temperature conditions.

Other objects relating to details of construction will become apparent from the following description read in conjunction with the accompanying drawings, in which:

Fig. 2 is a partial face view of the rotor showing the impeller construction;

Fig. 3 is a section on the plane indicated by line 3—3 of Fig. 2, and is an enlargement of a portion of Fig. 1;

Fig. 4 is a view generally similar to Fig. 2 showing a modified impeller construction;

Fig. 5 is a side elevation of the rotor of Fig. 4 with the blades removed to show constructional features;

Fig. 6 is an axial section of still another modified form of impeller construction;

Fig. 7 is a developed section through the impeller blades and turbine buckets taken as indicated at 7—7 in Figs. 2 and 3;

Fig. 8 is a developed section through the receiving portions of the turbine buckets taken as indicated at 8—8 in Fig. 3; and Fig. 9 is a partial face view of the rotor showing the form of the turbine buckets.

Figure 1:
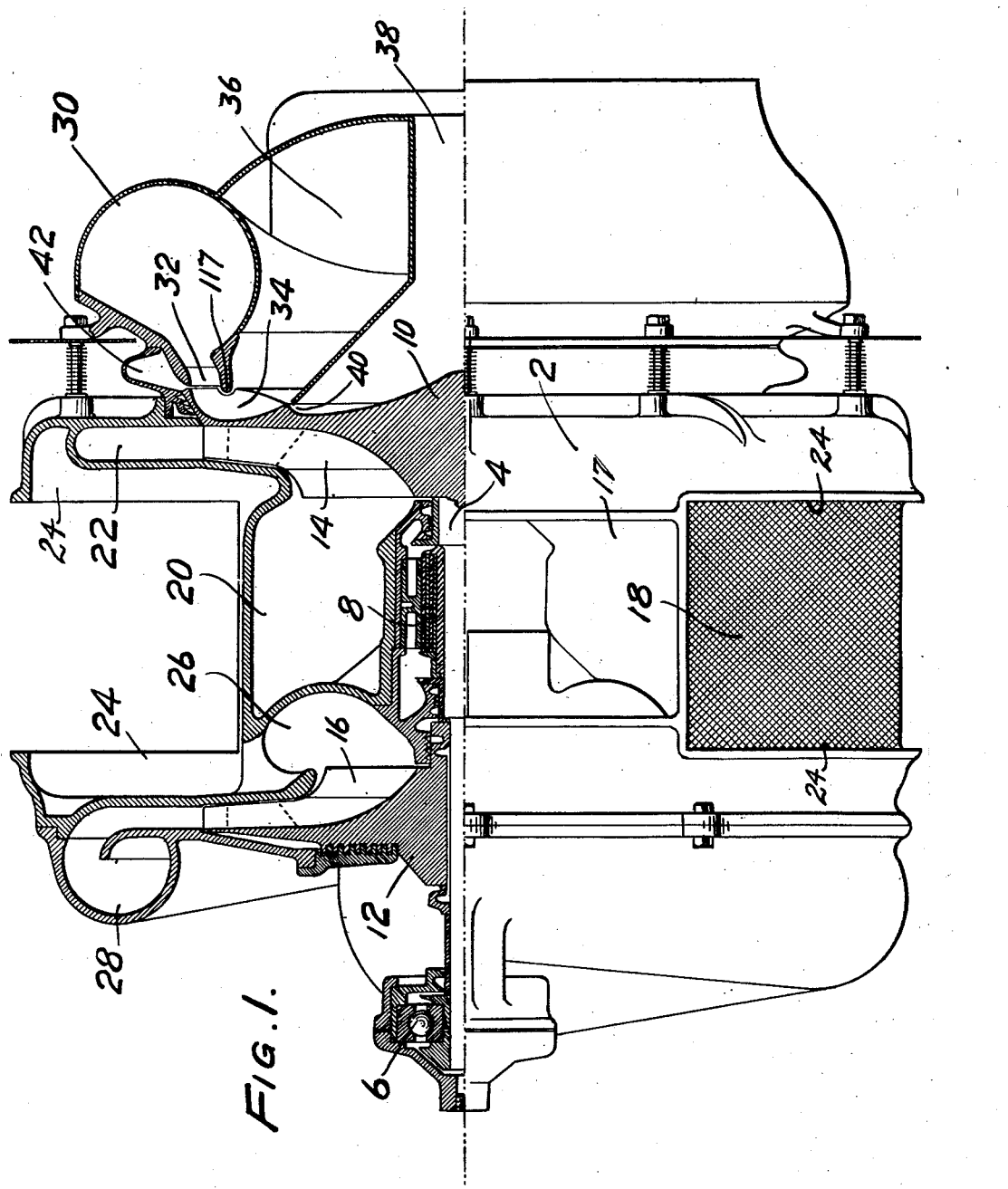
Fig. 1 is a side elevation partly in axial section of a turbo-compressor unit embodying the features of the invention.

Referring first to Fig. 1, it will be seen that the casing consists of a number of parts so arranged as to promote ready manufacture and assembly. Mounted for rotation within the casing is a shaft 4 supported at one end by a ball or roller bearing 6 of either a self-aligning type or a deep groove type having loose races so that a self-aligning effect is obtained. Near its other end but inside the overhung rotor 10, which is integral with or otherwise carried by shaft 4, is another bearing 8 consisting of a series of nested sleeves having slight clearance among themselves and the sleeve carried by the shaft so as to permit free rotation and slight transverse play, this bearing 8 being of the type specifically described in my said copending application.

As pointed out in that application, requirements of compactness and simplicity in the mechanism and arrangement for proper cooling dictate the use of an overhung rotor with its center of gravity outside the bearing supports. Because of the impracticability of providing a stiff type of shaft because of the large size of such shaft for a high speed impulse turbine, there is provided a flexible shaft which is capable of use with an overhung rotor since the bearing 8, permitting sidewise play of the shaft, eliminates the critical speed by removing the restraining forces which create the critical speed condition. Because of the free sidewise play, the overhung rotor 10, rotor 12 and shaft 4 rotate about their center of mass, even at low speed, so that there is no tendency towards vibration upon acceleration. Any vibrations which may occur as the shaft starts from rest and initially gains speed are rapidly damped by the action of the oil between the sleeves as described in my copending application.

The second rotor 12 secured to the shaft between the bearings is provided with blades indicated at 16 forming a second stage impeller while the rotor 10 is provided with blades 14 forming a first stage impeller. The blades 14 and 16 are similar and of novel construction and are hereafter described in detail.

The first stage impeller receives air through opening 17 and the intake space 20 surrounding the bearing 8 and is discharged therefrom into the volute 22 from which it passes through the honeycomb-type coolers 18 (only the lower of which is shown), supported by the headers 24, into space 26 from which it enters the second stage impeller and is discharged into the volute 28 through, if desired, suitable diffuser passages. From the volute 28 it passes to the carbureter or intake of the engine if the arrangement is used for supercharging.

As is pointed out in my copending application, a turbine operates efficiently only when designed and used for a constant pressure range and constant heat drop, whereas both pressure and energy of the exhaust of an engine cylinder change very much during the exhaust stroke. As a consequence the turbine buckets cannot efficiently receive gases from nozzles connected directly to the exhaust ports of a multi-cylinder engine. Furthermore it is not practical, because of resulting high back pressure, to use a receiver space of such dimensions between the nozzle and exhaust ports as to maintain a substantially constant pressure irrespective of the intermittent supply of gases from the engine.

In order to avoid these difficulties in operation, I provide, as described in detail in my copending application referred to above, an accumulator for storing up kinetic as well as pressure and heat energy, such receiver consisting of an annular chamber receiving exhaust gases from the engine through tangential primary nozzles and discharging the gases to the turbine buckets through secondary nozzles. This annular chamber is so designed with smooth walls and guiding vanes that the gases entering thereinto may circulate around with a minimum loss of velocity. There is thus produced a "gas flywheel" effect in which the energy of the gases remains kinetic. By proper design, in spite of the intermittent flow of gases into the accumulator, the discharge through the secondary nozzles is continuous, whereby the turbine operates at high efficiencies. Furthermore this action decreases the back pressure of the engine by reason of an ejector action. The accumulator may take numerous forms depending upon the type of engine with which it is associated.

In the present application there is illustrated only a portion of this accumulator namely the annular chamber 30 and the secondary nozzles 32 arranged to deliver the gases from the accumulator to the turbine buckets 34. These buckets, formed in the face of the rotor 10, are of novel type hereafter described in detail.

The discharge from buckets 34 passes into the annular passage 36 connected to a suitable exhaust pipe. A central opening 38 communicates with a flaring chamber adjacent the face of rotor 10, the walls of this chamber clearing the rotor at 40 near the inner extremities of the buckets. The arrangement is such that the gases discharging from the buckets exert an ejector action drawing air inwardly through 38 across the face of the rotor to produce a cooling action. The annular passage 36 may be so designed as to form a diffusor in which the high velocity of the discharge from the buckets is converted into pressure which means that the pressure at the bucket exit is less than the pressure in the diffusor, resulting in an increased energy yield of the turbine.

In order to overcome the centrifugal force to which the gases passing through the buckets are subjected, the expansion of the gases is finished in the buckets although it primarily takes place in the nozzles, the design of both nozzles and buckets being such as to effect this result. Accordingly there exists in annular chamber 42 about the nozzles 32 a moderate pressure which minimizes leakage of air from 22. However, care is taken in the design to obtain a lower pressure in 42 than in 22 so that there is a slight tendency of the air to leak from 22 rather than gas to leak from 42. Suitable flexible rings, maintaining very small clearances with the rotor, form labyrinthine tightening to further prevent leakage.

The impellers 14 and 16 illustrated in Fig. 1 and more specifically illustrated in Figs. 2 and 3 are of the most generally applicable form; however, since they are modified from the theoretically best type of construction, their description will be deferred until after the description of the construction illustrated in Figs. 4 and 5 which accords with the theory.

The advantages attendent upon the design of the impellers disclosed herein will be made most clear by brief reference to the failures of the impellers of conventional design. These impellers have vanes which are either in the form of radially extending planes through the axis of rotation, or surfaces having straight line elements parallel to the axis, the sections of which by planes perpendicular to the axis are curved so that the exit angles at the peripheries are less than right angles. Both of these forms offer grave disadvantages. First, the air entering the passages is subjected to two abrupt changes of direction of flow: first that occurring upon entrance as the flow changes from an axial direction to partake of the rotation of the rotor, and secondly, the change of flow to a radial direction towards the periphery. While stationary guide vanes are sometimes used to guide the inflowing air, there is still only a slight increase in efficiency, since large losses resulting from deflection nevertheless occur. Secondly, such vanes in the open radial type must be secured directly to the hub even for moderate speeds and it is impossible to locate auxiliary guide vanes to maintain proper flow between the flaring outer portions of the passages. While radially extending supporting walls are sometimes provided, the air passages are usually closed by the stationary walls of the casing, necessitating clearance which causes losses by leakage and eddies due to cross flow. While the above objectionable features are present at low speeds, additional factors render these impellers entirely impractical at very high speeds. The vanes have only relatively short lines of support at the hubs in proportion to their lengths. At high speeds, curved vanes are subject to enormous centrifugal stresses tending to force them to assume radial directions.

The construction which may be best understood from Figs. 4 and 5, avoids these objections by providing straight lines of flow from the entrance to the periphery, vanes having radial elements eliminating flexure due to centrifugal forces, and increased lines of attachment of the vanes to the discs so that in addition to the primary vanes, short guide vanes may be provided to maintain proper flow between the flaring peripheral portions of the primary vanes.

The surface of the rotor 50 opposite the turbine buckets, namely the outer side towards the shaft, has as its surface 60 a portion of a hyperboloid of revolution the portion of the hyperboloid used being evident from the continuation of the surface indicated by the lines 60a; that is, the surface used lies entirely to one side of the constricted portion of the hyperboloid. As is well known, a hyperboloid of revolution is not only the surface formed by rotation of a hyperbola about its minor axis, but is also the locus of a straight line rotating about an axis with which it has no common plane, so that the surface obviously has straight line elements. It follows conversely that, given a desired series of elements having certain directions relative to an axis of rotation, a hyperboloid surface may be constructed. It is this proposition which is used in designing the surface, as will be pointed out later.

In the present instance, certain equi-spaced grooves 62 are cut in the surface 60 along straight line elements thereof to serve to align the primary vanes, intermediate shorter similar straight grooves 64 being provided for the secondary vanes.

Reference to the construction lines in Fig. 4 will make clear the geometrical construction of a vane. As shown therein, a series of lines 66 may be constructed through the points of the center line of groove 62a perpendicular to the axis. There will result as the locus of these lines an elementary surface which may be considered to terminate at lines 68 and 69 where it intersects a conical surface 70 and a cylindrical surface 72, indicated in Fig. 5. This elementary surface is actually a skew surface of varying pitch, although under certain conditions it approximates a plane by which it may be replaced without departing from the invention. Each primary vane 74 may be considered to be built up upon this elementary surface so that the center of gravity of any section by a plane transverse to the axis of rotation will lie substantially in this surface. In other words, the elementary surface referred to lies substantially intermediate the faces of the vane.

Each secondary vane 76 may be considered to be similarly built up upon a similar elementary surface through grooves 64.

Preferably these vanes may be centered in the grooves and welded in place although it is obvious that other means of attachment might be adopted. Alternatively, the vanes might be cast integral with the hub, or the air passages might be formed by cutting out material from a block or forging.

The accomplishment of the various objects of the impeller design will now be obvious. The rotor 50 will be used similarly to either of rotors 10 or 12, receiving air from a space about the axis and discharging into a diffusor or volute. The direction of flow through an air passage adjacent the surface 60 will be along straight line elements of the surface. Knowing the mean speed of rotation and the amount of air delivered under normal conditions, the direction a straight line element should have to "scoop up" the air in the supply chamber and pass it without impact and at a proper angle to the periphery may be easily determined. Knowing this, the shape of the hyperboloidal surface and the blades follows. When properly designed, the air enters the blades in the direction of their surfaces without impact, flows in a straight line along surface 60, and is discharged without impact either into the volute or diffusor passages which would be so arranged as to receive the air without shock. The exit angle of the vanes is less than 90°, about 65°, making for maximum efficiency. The peripheral sides of the passages are preferably closed by the surface of the casing although if desired an annular wall might be carried by the outer edges of the vanes.

The theoretical radially extending ruled surface upon which any blade is regarded as formed may be expressed in cylindrical coordinates by the equation $x = C \tan p$, in which $x$ is the distance between any radial element and the shortest perpendicular to the axis of rotation from the straight line element 62 chosen to define the surface, $p$ is the angle between the radial element and the axial plane including said shortest perpendicular, and $C$ is a constant determined by the required characteristics of the surface. Consideration of this surface shows that the inlet angle $n$ at the radial leading edge of a blade at radius $r$ is given by the equation $$\tan n = \frac{C \sec^2 p_1}{r}$$

$p_1$ being the constant value of $p$ corresponding to the leading edge. Accordingly, with proper selection of the guide line 62a, the inlet angle decreases as the radius increases in substantially the theoretically proper manner to insure absence of impact throughout the radial extent of the leading edge. This feature is of particular importance for high speed impellers of very high peripheral velocity or in which the difference between the outermost inlet radius and the discharge radius is small.

While the surface defined by $x = C \tan p$ has straight line radial elements, it also has straight line elements in the direction of flow, all of these elements being in parallel planes parallel to the axis of rotation. It therefore follows that straight line flow occurs at the inlet of the blade and also approximately throughout the entire extent of a blade formed according to the outlined method, slight deviation from such flow being occasioned by the decrease in cross-sectional area of the passage.

The mechanical advantages of the construction are equally great. It will be noted that the line along which a vane is secured to the disc or hub is very long as compared with the vane area, insuring maximum strength. Because of this and the curvature of the surface 60, it is possible to provide the secondary guiding vanes 76 between the primary vanes in order to guide the stream and prevent eddying due to the fact that the divergence of the primary vanes becomes too large for good guidance without the auxiliary vanes.

The fact that the blades are secured along straight lines to the rotor makes manufacture very easy, enabling ready machining if the blades are made integral with the disc.

Because the elements of the vanes are substantially radial, the centrifugal stresses are exerted in tension only both within the vanes and at their junctures with the rotor, thus giving rise to strength capable of withstanding enormous speeds of operation of the order of 50,000 R. P. M. or more.

While one specific design of the vanes has been described, numerous changes which will still maintain the advantages will be obviously within the scope of the invention. For example, a construction such as that described, having the elements of the vanes radial, necessitates a slight departure from straight line flow through the outer portions of the passages. An alternative construction in which the walls of the vanes would be straight lines throughout in the direction of flow might be adopted. In such case the vane elements would depart slightly from a strict radial direction though not to any extent which would involve the creation of destructive stresses.

The surface of the rotor is preferably a hyperboloid of one nappe generated by the rotation of a straight line as described. This surface is readily produced by mere turning and automatically provides the straight lines demarking the attachments of the blades. Furthermore, a straight line guiding surface is produced. It will, however, be obvious that the surface between the blades may be other than hyperboloidal and, though not hyperboloidal, may guide the gases in straight paths. From the broadest standpoint, therefore, it may be said that the preferred blades approximate construction on a surface elements of which extend substantially radially from a straight line which lies in a plane spaced from and parallel to the axis and intersects at an oblique angle planes perpendicular to the axis, this line being an element of a hyperboloidal surface which may or may not appear in the actual construction.

The attachment of impeller blades along straight line elements of the hyperboloidal surfaces of the rotor has already been proposed. However, such blades have been made to extend axially rather than radially from their attachment so that both improper passages and failure under centrifugal stresses have resulted.

The design of impeller vanes so far described which provides one continuous skew surface for each vane, while theoretically best, cannot always be practically used. It is found that in certain cases in order to obtain correct inlet angles and areas the axial extent of the construction from the inlet plane to the outlet plane becomes greater than is desirable for a light and compact design. This is avoided by an alternative design illustrated in Figs. 1, 2 and 3.

In this modification each vane consists of two parts 80 and 82, and the surface of the rotor disc consists of two portions, the former of which, extending from $m$ to $n$ as shown in Fig. 3, is hyperboloidal, and the latter of which, extending from $n$ to $p$ is smoothly curved, merging with the hyperboloidal surface at $n$ but deviating therefrom and extending substantially perpendicularly to the axis at $p$. The extensions of the hyperboloidal surface beyond $m$ and $n$ are indicated by the construction lines $mq$ and $nr$.

The parts 80 of the vanes extend similarly to the vanes already described from straight line elements 84 of the hyperboloidal surface and may be considered as built up on the surface forming the locus of radial lines 86 through 84, the vanes terminating in proximity to the boundaries of the intake opening.

The parts 80 of the vanes may be conveniently secured to the rotor by drilling in the rotor holes 88 which break through the hyperboloidal surface forming slots along the straight line elements 84. The parts 80 which may be formed by pressing from sheet aluminum are provided with crescent shaped extensions 90 which may be slipped within the drilled holes, pins 92 serving to fill the holes and lock them in position. The vanes may of course be secured in similar fashions by dovetailing, etc., this general type of fixation being rendered possible by the straight lines along which attachment takes place.

The parts 82 of the vanes are built up upon axial planes and join the parts 80 nicely along radial lines indicated at 94. The parts 82 as well as the axial auxiliary vanes 96 may be conveniently formed by milling from a solid rotor blank. The parts 80 and 82 may remain separated along 94 or may be secured together by welding or the like.

In the above construction, it will be obvious that the hyperboloidal surface will be so formed that the correct inlet angles and areas are provided in accordance with the proper theoretical construction. Reference to the trace $qr$ of the hyperboloidal surface will show, however, that if this surface were continued very considerable axial space would be needed to secure a proper outlet angle. By the construction just described a proper outlet angle is obtained with conservation of axial extent. For practical purposes the construction is substantially as efficient as the theoretical, the slight "kink" in the air path at 94 occasioning no serious losses.

While the part 80 is formed preferably on the theoretical skew surface, it may be formed on the plane through 84 and the radial element at 94 without serious departure from optimum shape.

The two parts 80 and 82 might, of course, be made integral to secure a construction equivalent in operation, but because of difficulties in manufacture and attachment the separate form is preferred.

A third construction, in which the two parts of each vane have the same surfaces as illustrated in Figs. 2 and 3, is shown in Fig. 6. In this construction the outlet portions 102 of the main vanes and the auxiliary vanes (not shown) are milled from the solid rotor disc. An equal number of inlet vane portions 106 are milled out of the periphery of a ring 104 which is joined to the main disc by a circular dovetailing arrangement and clamped thereto by a nut 108 threaded on the shaft. The dovetailing arrangement permits the centrifugal forces to be transmitted to and taken up by the rotor disc giving a very strong construction particularly advantageous if the inlet portions are of aluminum.

In my copending application there are formed in the rotor disc on the side opposite the impeller vanes adjacent semicircular cavities forming turbine buckets. While this form specifically illustrated therein answers its purpose of giving the greatest possible protection against the heat of the gases and has a high theoretical efficiency as brought out below, the loss of guidance at the bucket outlet due to the nonexistence of any partition wall results in a loss of efficiency. There is described herein a modified improved construction which, while retaining all advantages of the other overcomes its drawbacks.

Heretofore milled cavities have been used to take the place of turbine buckets. However, they have always been placed in an axial direction, generally on the periphery of the wheel, so that the inlet and outlet portions move at the same linear velocity. I have found that by using similar milled out buckets extending in a substantially radial direction with the inlet outermost so that the peripheral velocity at the inlet is greater than that at the outlet a great increase in efficiency occurs.

The following are the maximum efficiencies obtainable by buckets of identical capacities having the same losses due to friction and shock but having different ratios of outlet to inlet peripheral velocities:

| Ratio | Efficiency percent |
|---|---|
| 0.50 | 84.0 |
| 0.75 | 78.2 |
| 1.00 | 73.4 |
| 2.00 | 55.8 |

The ratio 1.00 represents, of course, axially arranged buckets, while ratio 2.00 represents radial buckets through which the flow is outward. The other two ratios represent buckets of the preferred inward flow type which have considerably greater efficiencies than the axial buckets.

Reference to Figs. 1, 3, 7, 8 and 9 will make clear the preferred bucket construction. The inwardly convergent slots which form the buckets 32 comprise inlet portions 112 and outlet portions 114, the walls between the buckets being grooved as indicated at 116 (by initial cutting of the face of the blank) to receive the annular nose 117 separating the inlet nozzles from the exhaust passageway. In conjunction with the bucket walls this nose provides the usual curved passageway into which the gases enter, by which they are diverted, and from which they issue.

It is found that, particularly when the milled out type of bucket is used in a radial direction with the flow of gases inwardly in opposition to the centrifugal forces, the efficiency can be very materially increased by making the exit angle smaller than the inlet angle. To accomplish this result, the part of the wall below the groove 116 is bent, or twisted, from its original position 120 illustrated in construction lines in Fig. 9, in which it lies in the plane of the part above the groove, to the position 118, being welded in this position by a filler 122. As brought out clearly in Fig. 7, this results in a decreased discharge angle. It is to be noted that because of this decreased discharge angle the outlet height is increased in order to obtain the proper outlet area for the gas flow. An advantageous result of this is a much lighter and more compact rotor construction. The buckets are so designed as to complete the expansion as noted above.

To form the construction illustrated in my copending application, a single milling operation is necessary to form each bucket, but as a result, if a maximum number of buckets is provided, the walls between the discharge portions disappear with loss of proper guidance. In the present construction the partition walls are of substantially uniform thickness throughout the radial extent of the buckets and consequently the buckets are convergent inwardly. This, of course, somewhat complicates the manufacture, but complete and proper guidance of the discharge is attained. While the manufacture is facilitated by first forming the walls on one plane and thereafter bending the inner part, as described, it is obvious that a modified milling operation may effect the preferred final construction without bending.

The great advantages of the present design of buckets will be appreciated when the objections to the usual peripheral buckets are considered. While peripheral buckets, if properly secured to a rotor, are satisfactory at the comparatively low temperatures of a steam turbine, they cannot stand up under the formidable combination of high speeds and temperatures of a gas turbine. The reason is obvious. To secure a certain necessary deflection of the working fluid, a certain concave working area of the buckets must be provided. This area is subject to the heat of the fluid. On the other hand only a relatively small area of contact of the buckets with the rotor disc is provided to conduct away the heat they receive, this area usually being considerably less than the working area.

In the improved construction disclosed herein, substantially all of the working area is at the same time an area capable of conducting the heat to the rotor disc. Furthermore, there is no possibility of the buckets being torn away centrifugally, and the dead weight added to the periphery of the disc is a minimum. The shape of the buckets is proper to secure maximum efficiency. Moreover, due to groove 116, all the metal of the vanes which is so far from the main mass of the disc as to be in danger of getting overheated or burned is removed.

Conduction of heat to the rotor requires its dissipation therefrom. The action at 40 to draw air through 38 to cool the inner portion of the rotor face has been referred to. The primary cooling effect is, however, due to the primary and secondary vanes which are either integral or closely associated with the disc thereby insuring maximum conductivity. Furthermore the greater part of the area of the disc on both sides is directly in contact with a rapid stream of air so that cooling far below any dangerous temperature is readily obtained.

From the above detailed description of a preferred embodiment of the invention it will be seen that there are provided various features of construction of general application to the design of turbines or centrifugal compressors either alone or in combination, and it is to be understood that the specific application of these features to a supercharging system for internal combustion engines is not intended as a disclaimer of these features when used alone. The combination, however, is of particular value when used in a compact type of supercharging unit.

While specific preferred forms of the various features have been described various modifications will be apparent to those skilled in the art within the scope of the following claims.

What I claim is:

1. A turbo-compressor having a rotor mounted for rotation about an axis and including a supporting disc, impeller vanes carried by said disc on one side thereof, said disc having slots formed in the other side thereof providing buckets, and nozzles for directing hot gases into the buckets to drive the rotor, said disc serving to conduct heat from the walls of the bucket slots to the side which is cooled by air flowing through the impeller passages.

2. A turbo-compressor including a shaft, an overhung rotor carried by one end of the shaft, said rotor including a supporting disc, impeller vanes carried by said disc on the side adjacent the shaft, said disc having slots formed in the other side thereof providing buckets, and nozzles for directing hot gases into the buckets to drive the rotor, said disc serving to conduct heat from the walls of the bucket slots to the side which is cooled by air flowing through the impeller passages.

3. A turbo-compressor including a shaft, an overhung rotor carried by one end of the shaft, said rotor including a supporting disc, impeller vanes carried by said disc on the side adjacent the shaft, said disc having slots formed in the other side thereof providing buckets, nozzles for directing hot gases into the buckets to drive the rotor, said disc serving to conduct heat from the walls of the bucket slots to the side which is cooled by air flowing through the impeller passages, and means for directing cooling gas against the turbine side of the disc inside the circle of buckets.

4. A turbine construction including a rotor consisting of a disc having slots in the side thereof forming buckets, the slots forming passages having a general radial extent and being angularly disposed relatively to a plane perpendicular to the axis of rotation, and means for directing gases into the outer portions of the slots whereby the gases first flow in the direction of rotation and are then deflected backwardly relatively to the rotor and inwardly of the periphery, the buckets being so formed that the discharge angle of the gases relatively to a plane perpendicular to the axis of rotation is less than the inlet angle.

5. A turbine construction including a rotor consisting of a disc having slots in the side thereof forming buckets, the slots forming passages having a general radial extent and being angularly disposed relatively to a plane perpendicular to the axis of rotation, and means for directing gases into the outer portions of the slots whereby the gases first flow in the direction of rotation and are then deflected backwardly relatively to the rotor and inwardly of the periphery, the buckets being so formed, by deflecting of the partition walls between adjacent buckets, that the discharge angle of the gases relatively to a plane perpendicular to the axis of rotation is less than the inlet angle.

6. A turbo-compressor having a rotor mounted for rotation about an axis and including a supporting disc, impeller vanes carried by said disc on one side thereof, said disc having slots formed in the other side thereof providing buckets, and nozzles for directing hot gases into the buckets to drive the rotor, said parts being designed to maintain pressure on the turbine side of the rotor to reduce flow of compressed gas from the impeller side over the periphery.

7. A turbo-compressor having a rotor mounted for rotation about an axis and including a supporting disc, impeller vanes carried by said disc on one side thereof, said vanes contacting said disc throughout substantially their entire radial extent, said disc having slots formed at the other side thereof providing buckets, and nozzles for directing hot gases into the buckets to drive the rotor, the air handle by the impeller serving to cool the vanes and disc surface to which heat is conducted by the disc from the buckets.

8. A turbo-compressor having a rotor mounted for rotation about an axis and including a supporting disc, impeller vanes carried by said disc on one side thereof, said vanes having an extended radial junction with said disc which is of a length substantially exceeding the axial extent of the vanes, said disc having slots formed in the other side thereof providing buckets, and nozzles for directing hot gases into the buckets to drive the rotor, the air handle by the impeller serving to cool the vanes and disc surface to which heat is conducted by the disc from the buckets.

9. A turbo-compressor having a rotor mounted for rotation about an axis and including a supporting disc, impeller vanes carried by said disc on one side thereof, said vanes having an extended radial junction with said disc which is of a length substantially exceeding the axial extent of the vanes, said disc having slots formed in the other side thereof providing buckets, the slots forming passages having a general radial extent and being angularly disposed, and means for directing gases into the outer portions of the slots whereby the gases first flow in the direction of rotation and are then deflected backwardly relatively to the rotor and inwardly of the periphery, the air handle by the impeller serving to cool the vanes and disc surface to which heat is conducted by the disc from the buckets.

10. A turbo-compressor having a rotor mounted for rotation about an axis and including a supporting disc, impeller vanes integral with said disc on one side thereof, said vanes having a junction with the body of the disc of substantial radial extent and substantially longer than the axial extent of said vanes, said disc having slots formed in the other side thereof providing buckets, and nozzles for directing hot gases into the buckets to drive the rotor, the air handle by the impeller serving to cool the vanes and disc surface to which heat is conducted by the disc from the buckets.

11. A turbo-compressor having a rotor mounted for rotation about an axis and including a supporting disc, impeller vanes integral with said disc on one side thereof, said vanes having a junction with the body of the disc of substantial radial extent and substantially longer than the axial extent of said vanes, said disc having slots formed in the other side thereof providing buckets, the slots forming passages having a general radial extent and being angularly disposed, and means for directing gases into the outer portions of the slots whereby the gases first flow in the direction of rotation and are then deflected backwardly relatively to the rotor and inwardly of the periphery, the air handle by the impeller serving to cool the vanes and disc surface to which heat is conducted by the disc from the buckets.

12. A turbine construction including a rotor consisting of a disc having slots in the side thereof forming buckets, the slots forming passages having a general radial extent and being angularly disposed relatively to a plane perpendicular to the axis of rotation, and means for directing gases into the outer portions of the slots whereby the gases first flow in the direction of rotation and are then deflected backwardly relatively to the rotor and inwardly of the periphery, the radial extent of the discharge cross-sectional area of a bucket being substantially greater than the radial extent of the inlet cross-sectional area thereof.

RUDOLPH BIRMANN.